United States Patent
Ahlstrom et al.

(10) Patent No.: US 10,732,123 B2
(45) Date of Patent: Aug. 4, 2020

(54) INSPECTION ROUTING SYSTEMS AND METHODS

(71) Applicant: FLIR Systems AB, Taby (SE)

(72) Inventors: Mats Ahlstrom, Sollentuna (SE); Kent Wickenberg, Taby (SE); Tintin Razavian, Sollentuna (SE)

(73) Assignee: FLIR SYSTEMS AB, Täby (SE)

( * ) Notice: Subject to any disclaimer, the term of this patent is extended or adjusted under 35 U.S.C. 154(b) by 93 days.

(21) Appl. No.: 15/992,762

(22) Filed: May 30, 2018

(65) Prior Publication Data

US 2018/0348143 A1    Dec. 6, 2018

Related U.S. Application Data

(60) Provisional application No. 62/513,364, filed on May 31, 2017.

(51) Int. Cl.

| G06K 9/00 | (2006.01) |
| G01N 21/88 | (2006.01) |
| G06F 3/0481 | (2013.01) |
| G06T 7/00 | (2017.01) |
| H04L 29/06 | (2006.01) |
| G01N 21/84 | (2006.01) |

(52) U.S. Cl.
CPC ......... *G01N 21/88* (2013.01); *G06F 3/04817* (2013.01); *G06T 7/0004* (2013.01); *H04L 67/42* (2013.01); *G01N 2021/8411* (2013.01)

(58) Field of Classification Search
CPC ............ G01N 21/88; G01N 2021/8411; H04L 67/42; G06T 7/0004; G06F 3/04817
See application file for complete search history.

(56) References Cited

U.S. PATENT DOCUMENTS

| 7,847,251 | B1 | 12/2010 | Praly | |
| 8,148,687 | B1 | 4/2012 | Praly | |
| 2010/0013656 | A1* | 1/2010 | Brown | G08B 13/19613 340/686.6 |
| 2012/0293623 | A1* | 11/2012 | Nygaard | G01N 21/9508 348/46 |
| 2013/0229511 | A1* | 9/2013 | Oostendorp | H04N 7/181 348/92 |
| 2014/0346097 | A1* | 11/2014 | Kujacznski | G01N 21/89 209/587 |
| 2017/0206643 | A1* | 7/2017 | Weiss | G06F 3/04845 |
| 2018/0211115 | A1* | 7/2018 | Klein | G08B 25/10 |
| 2018/0211204 | A1* | 7/2018 | Bruns | G06Q 10/087 |
| 2018/0224837 | A1* | 8/2018 | Enssle | G06F 16/2457 |
| 2018/0300865 | A1* | 10/2018 | Weiss | G06T 7/001 |
| 2018/0348143 | A1* | 12/2018 | Ahlstrom | G01N 21/88 |
| 2019/0096057 | A1* | 3/2019 | Allen | H04N 7/188 |

(Continued)

*Primary Examiner* — Aaron W Carter

(74) *Attorney, Agent, or Firm* — Haynes and Boone, LLP

(57) ABSTRACT

Various techniques are disclosed to provide a cloud-based, networked infrared (IR) inspection routing system that provides a user interface for remotely defining an inspection routing workflow for an inspection of a site, and provides an IR camera that presents customized and context-aware instructions to an on-site inspector to perform the inspection. The IR camera may be further configured to analyze IR images that are captured during the inspection and provides additional guidance in response to the analysis of the captured IR images according to the defined inspection routing workflow.

19 Claims, 9 Drawing Sheets

(56) References Cited

U.S. PATENT DOCUMENTS

2019/0141236 A1* 5/2019 Bergstrom ......... G06K 9/00671
2019/0168787 A1* 6/2019 Messinger ............ B61L 25/021
2019/0193946 A1* 6/2019 DeVries ................ B65G 43/02
2019/0196003 A1* 6/2019 Chen ..................... G01S 13/887
2019/0259141 A1* 8/2019 Weiss .................. G06F 3/04842

* cited by examiner

INSPECTION ROUTING SYSTEMS AND METHODS

CROSS REFERENCE TO RELATED APPLICATIONS

This application claims the benefit of and priority to U.S. Provisional Patent Application No. 62/513,364 filed May 31, 2017 and entitled "INSPECTION ROUTING SYSTEMS AND METHODS," which is incorporated herein by reference in its entirety.

TECHNICAL FIELD

One or more embodiments of the invention relate generally to networked systems for inspection devices, and more particularly, to networked systems for managing and facilitating the use of infrared cameras in the inspection of industrial plants.

BACKGROUND

Infrared (IR) cameras are often used for monitoring and/or inspection of various types of installations (e.g., industrial plants, electrical installations, etc.). During a routine inspection, an operator is often instructed to follow a specific route and take IR images of predefined objects at predefined locations in the plant, in order to determine whether temperatures at certain parts of the plant indicate an abnormal condition, thereby avoiding equipment failure. However, there is a need for improved techniques that can reduce cost and improve efficiency of performing such inspections.

SUMMARY

Various embodiments of the methods and systems disclosed herein may be used to provide a cloud-based, networked infrared (IR) inspection routing system that provides a user interface for remotely defining an inspection routing workflow for an inspection of a site, and provides an IR camera that presents customized and context-aware instructions to an on-site inspector to perform the inspection. The IR camera may be further configured to analyze IR images that are captured during the inspection and provides additional guidance in response to the analysis of the captured IR images according to the defined inspection routing workflow. Thus, the cloud-based, networked IR inspection routing system enables a qualified analyst to remotely create and/or modify one or more inspection routing workflows for one or more work sites without being present on the sites and enables an inspection operator to perform an infrared inspection of the site without interfacing with the qualified analyst.

In some embodiments, the user interface enables a user of the system to define one or more checkpoints along an inspection route as part of the inspection routing workflow. Each checkpoint may include a set of instructions to be provided to the inspection operator, such as capturing one or more IR images of one or more objects at the checkpoint, capturing one or more images in visible wavelengths of one or more objects at the checkpoint, performing a visual and/or audio inspection of a certain area at the checkpoint, additional notes and comments related to the checkpoint, etc.

Additionally, each checkpoint may include criteria for determining whether one or more abnormal conditions are present at the checkpoint. The criteria for determining whether the one or more abnormal conditions are present may be based on the captured IR images and/or the captured images in visible wavelengths. Thus, the system may determine that an abnormal condition for the checkpoint exists based on an analysis of the images captured at the checkpoint.

Furthermore, the user interface may also enable the user to define, as part of the inspection routing workflow, actions that are triggered by the detection of one or more abnormal conditions at the one or more checkpoints. The actions may include instructing the inspection operator to perform additional inspection, instructing the inspection operator to notify other personnel on the site, transmitting an emergency signal to a remote device, modifying the captured IR images and/or the images in visible wavelengths, and/or any other types of actions that can be performed by the IR camera of the system.

Once defined by the user, the inspection routing workflow may be stored in a database of the system, which may be implemented within the computing device of the user and/or as a cloud data storage that is accessible via the Internet. The user interface may enable the user to subsequently modify (update) the inspection routing workflow after it is defined. For example, the user may decide to adjust the inspection routing workflow based on a report generated by the cloud-based, networked IR inspection routing system from a completed inspection.

The IR camera, in accordance with some embodiments of the disclosure, is configured to retrieve the inspection routing workflow. Once retrieved, the IR camera may be configured to provide instructions to the operator of the IR camera to perform the inspection of the site according to the defined inspection routing workflow. As the operator captures IR images and/or visible light (VL) images (e.g., images in the visible wavelengths) during the inspection, the IR camera may analyze the images and perform actions defined in the inspection routing workflow in response to the analysis of the images. For example, the IR camera may detect that an abnormal condition exists at one of the checkpoints (assets) by analyzing images captured at the checkpoint based on the abnormal condition criteria defined in the inspection routing workflow, and the IR camera may be configured to perform an action that corresponds to the detected abnormal condition based on the inspection routing workflow. As discussed above, the IR camera may be configured to modify the images captured at the checkpoint, provide additional instructions to the operator, transmit an alert to a remote device, and/or other actions defined in the inspection routing workflow.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
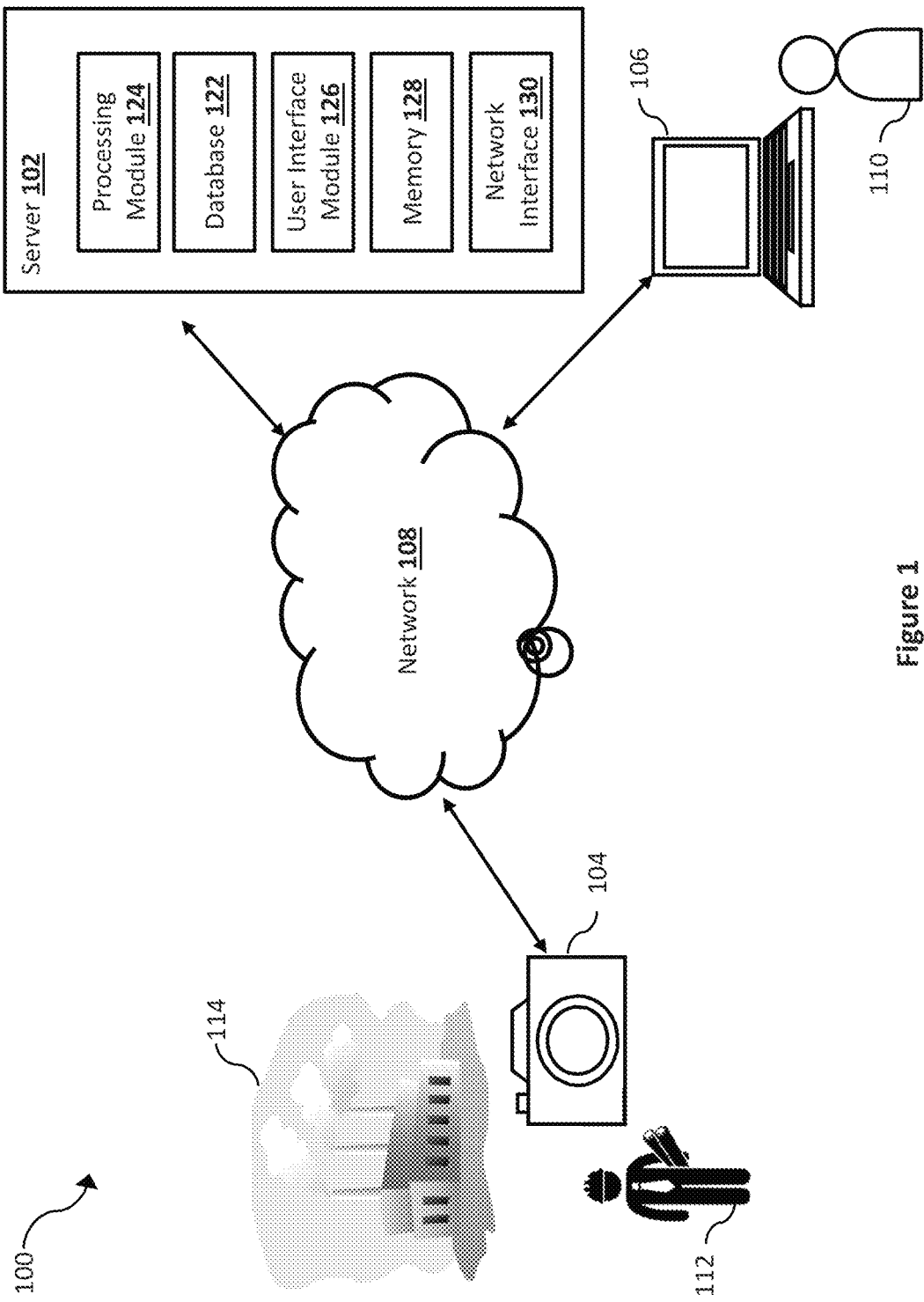
FIG. 1 illustrates a cloud-based infrared inspection routing system in accordance with an embodiment of the disclosure.

Various embodiments of the methods and systems disclosed herein may be used to provide a cloud-based, networked infrared (IR) inspection routing system that provides a user interface for remotely defining an inspection routing workflow for an inspection of a site, and provides an IR camera that presents customized and context-aware instructions to an on-site inspector to perform the inspection. The IR camera may be further configured to analyze IR images that are captured during the inspection and provides additional guidance in response to the analysis of the captured IR images according to the defined inspection routing workflow. Thus, the cloud-based, networked IR inspection routing system enables a qualified analyst to remotely create and/or modify one or more inspection routing workflows for one or more work sites without being present on the sites and enables an inspection operator to perform an infrared inspection of the site without interfacing with the qualified analyst. In this way, for example, various embodiments of the disclosure advantageously reduce the cost and inefficiencies associated with the qualified analyst being on the sites or otherwise providing guidance to the inspection operator in real time while performing the inspection.

In some embodiments, the user interface enables a user of the system (e.g., a qualified analyst) to define one or more checkpoints (assets) along an inspection route as part of the inspection routing workflow. Each checkpoint may include a set of instructions to be provided to the inspection operator, such as capturing one or more IR images of one or more objects at the checkpoint, capturing one or more VL images (e.g., in visible wavelengths) of one or more objects at the checkpoint, performing a visual and/or audio inspection of a certain area at the checkpoint, providing additional annotations (e.g., notes, comments, geo-positional information, or other information) related to the checkpoint, etc.

Additionally, each checkpoint may include criteria for determining whether one or more abnormal conditions are present at the checkpoint. The criteria for determining whether the one or more abnormal conditions are present may be based on the captured IR images and/or the captured images in visible wavelengths. For example, using the user interface of the system, the user may define that an abnormal condition for a checkpoint exists when the temperature of a water pipe at the checkpoint deviates from a normal range (e.g., exceeds a predetermined threshold or outside of a temperature range, etc.). Thus, the system may determine that an abnormal condition for the checkpoint exists when an IR image of the water pipe during an inspection indicates that the temperature of the water pipe exceeds the predetermined threshold.

Furthermore, the user interface may also enable the user to define, as part of the inspection routing workflow, actions that are triggered by the detection of one or more abnormal conditions at the one or more checkpoints. The actions may include instructing the inspection operator to perform additional inspection, instructing the inspection operator to notify other personnel on the site, transmitting an emergency signal to a remote device, processing (e.g., modifying) the captured IR images and/or the images in visible wavelengths, and/or any other types of actions that can be performed by the IR camera of the system.

Once defined by the user, the inspection routing workflow may be stored in a database of the system, which may be implemented within the computing device of the user and/or as a cloud data storage that is accessible via the Internet. The user interface may enable the user to subsequently modify (update) the inspection routing workflow after it is defined. For example, the user may decide to adjust the inspection routing workflow based on a report generated by the cloud-based, networked IR inspection routing system from a completed inspection indicating that there are too many false alarms. The system may be configured to then transmit the data related to the inspection routing workflow to an inspection device, such as an IR camera.

The IR camera, in accordance with some embodiments of the disclosure, is configured to retrieve the inspection routing workflow (e.g., downloading the inspection routing work flow via the Internet). Once retrieved, the IR camera may be configured to provide instructions to the operator of the IR camera (e.g., an inspection operator) to perform the inspection of the site according to the defined inspection routing workflow. As the operator captures IR images and/or VL images during the inspection, the IR camera may analyze the images and perform actions defined in the inspection routing workflow in response to the analysis of the images. For example, the IR camera may detect that an abnormal condition exists at one of the checkpoints by analyzing images captured at the checkpoint based on the abnormal condition criteria defined in the inspection routing workflow, and the IR camera may be configured to perform an action that corresponds to the detected abnormal condition based on the inspection routing workflow. As discussed above, the IR camera may be configured to process (e.g., modify) the images captured at the checkpoint, provide additional instructions to the operator, transmit an alert to a remote device, and/or other actions defined in the inspection routing workflow. For example, the IR camera may be configured to process the IR images to enhance the IR images in response to detecting a condition that meets the defined criteria, such as by combining image data (e.g., high spatial frequency data representing edges and/or contours) from the VL images with the IR images (e.g., according to the techniques described in U.S. patent application Ser. No. 15/267,133 filed Sep. 15, 2016) and/or by highlighting (e.g., displaying in a different or contrasting color) hot spots, cold spots, or other areas of the IR image exhibiting a condition that meets the defined criteria.

FIG. 1 illustrates a cloud-based IR inspection routing system 100 in accordance with some embodiments of the disclosure. The IR inspection routing system 100 includes an inspection server 102, an inspection device 104, and a personal computing device 106. Inspection device 104 may include any networked devices that may be used in an inspection of a facility, for example, including but not limited to a thermographic inspection device or an IR camera. Personal computing device 106 may be implemented using any appropriate hardware and software configured for wired and/or wireless communication over network 108. For example, in some embodiments, personal computing device 106 may be implemented as a personal computer (PC), a smart phone, personal digital assistant (PDA), laptop computer, a digital camera, an IR camera (e.g., inspection device 104 implemented as an IR camera), and/or other types of computing devices capable of transmitting and/or receiving data.

Personal computing device 106 may include one or more browser applications which may be used, for example, to provide a convenient interface to permit user 110 to browse information available over network 108. For example, in one embodiment, browser application may be implemented as a web browser configured to display a user interface generated by server 102 for defining an inspection routing workflow. Personal computing device 106 may also include one or more toolbar applications which may be used, for example, to provide client-side processing for performing desired tasks in response to operations selected by user 110. In one embodiment, toolbar application may display a user interface in connection with browser application. Personal computing device 106 according to some embodiments may be implemented using inspection device 104, such as a thermographic inspection device or an IR camera, that is configured to communicate with server 102 to enable user 110 to define an inspection routing workflow.

Although only one inspection server, one inspection device, and one personal computing device is shown in this example, it has been contemplated that more than one inspection server, more than one inspection device, and more than one personal computing device may be included within the cloud-based IR inspection routing system without departing from the scope and spirit of the disclosure.

As shown, inspection server 102, IR camera 104, and personal computing device 106 are communicatively coupled with each other over a network 108. Network 108 may be implemented as a single network or a combination of multiple networks. For example, in various embodiments, network 108 may include the Internet or one or more intranets, landline networks, wireless networks, cellular networks, and/or other appropriate types of networks.

Inspection server 102 may include one or more physical or virtual processing devices, and may include, for example, stand-alone or enterprise-class servers operating a server operating system such as MICROSOFT® OS, a UNIX® OS, a LINUX® OS, or other suitable server-based OS. Inspection server 102 may include one or more processors (e.g., processing module 124), non-transitory memories (e.g., non-transitory memory 128), and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of server 102, and/or accessible over network 108.

Network 108 may be implemented as a single network or a combination of multiple networks. For example, in various embodiments, network 108 may include the Internet or one or more intranets, landline networks, wireless networks, and/or other appropriate types of networks.

Inspection server 102 in accordance with one embodiment of the disclosure may also include a database (e.g., database 122) for storing inspection data related to one or more inspection work flow defined by one or more users. Inspection server 102 is configured to provide a user interface (by using user interface module 126) that enables a user 110 (e.g., a qualified inspection analyst) to define an inspection work flow and presents an inspection report to the user based on a complete inspection of a site. For example, the user interface may be provided on personal computing device 106. Personal computing device 106 may be part of inspection server 102 or may be communicatively coupled with inspection server 102 over network 108. Inspection server 102 of some embodiments also includes a network interface 130 (e.g., a network card, a wifi antenna, etc.) for transmitting data to and/or receiving data from personal computing device 106 and/or inspection device 104.

In some embodiments, the user interface may be implemented as an interactive website through which qualified personnel 110 may interact with inspection server 102 to define one or more inspection work flows and generate inspection reports. In such embodiments, inspection server 102 may also include a web server that is configured to interact with a web browser operating in a client device (e.g., personal computing device 106) using one or more web application and web service protocols (e.g., IP, HTTP, SOAP, REST, XML-RPC, WPS, IMAP, ICMP, FTP, and/or other suitable protocols).

Figure 2:
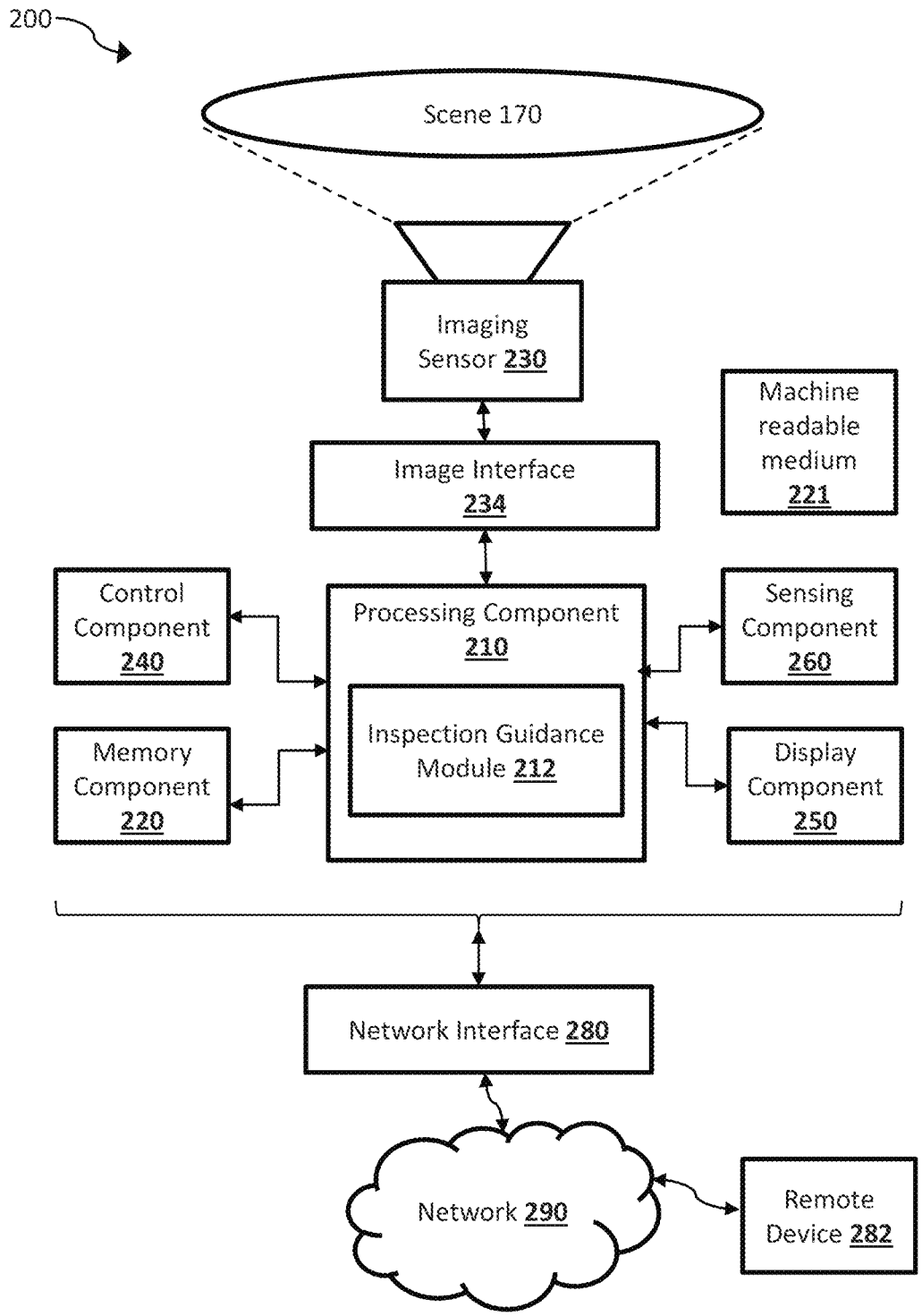
FIG. 2 is a schematic of an IR camera in accordance with an embodiment of the disclosure.

IR camera 104 may be used by an operator 112 (e.g., an inspection operator) during an inspection of site 114. In accordance with some embodiments of the disclosure, IR camera 104 is configured to provide to operator 112 context-aware guidance and to capture various data such as image data (e.g., IR images, VL images, etc.) and measurement data (e.g. spot temperature measurement, area temperature measurement, average temperature measurement by an IR imaging sensor, and/or measurement of other parameters by one or more other sensing components, etc.) during the inspection of site 114. Turning now to FIG. 2, a block diagram is illustrated of an example of an IR camera system 200 that may be implemented in IR camera 104 for providing context-aware guidance to an operator during an inspection according to a pre-defined inspection routing workflow, in accordance with an embodiment of the disclosure. System 200 comprises, according to one implementation, a processing component 210, a memory component 220, one or more imaging sensors 230, an image interface component 234, a control component 240, a display component 250, a sensing component 260, and a communication interface device 280.

Imaging sensors 230, in some embodiments, may include an IR imaging sensor which may be implemented, for example, with a focal plane array (FPA) of bolometers, thermocouples, thermopiles, pyroelectric detectors, or other IR sensor elements responsive to IR radiation in various wavelengths such as for example, in the range between 1 micron and 14 microns. In one example, image sensor 120 may be configured to capture images of near IR and/or short-wave IR radiation from a scene 170 (e.g., a scene within site 114 during an inspection). In another example, imaging sensors 230 may include a thermal IR sensor configured to capture images of IR radiations in the mid-wave (MWIR) or long-wave (LWIR) wavelength ranges (e.g., capturing IR images that are thermal images comprising pixels with temperature information).

Imaging sensors 230, in some embodiments, may include a visible light (VL) imaging sensor which may be implemented, for example, with a charge-coupled device (CCD) sensor, a complementary metal-oxide semiconductor (CMOS) sensor, an electron multiplying CCD (EMCCD), a scientific CMOS (sCMOS) sensor and/or other appropriate image sensor to generate image signals of visible light received from the scene. Depending on the sensor type, VL camera may be configured to capture electromagnetic radiation in other wavelengths in addition to or instead of visible light. In some embodiments, imaging sensors 230 may include both a VL imaging sensor and an IR imaging sensor.

Processing component 210 (logic device) may be implemented as any appropriate circuitry or device (e.g., a processor, microcontroller, application specific integrated circuit (ASIC), field-programmable gate array (FPGA), or other programmable or configurable logic devices) that is configured (e.g., by hardware configuration, software instructions, or a combination of both) to perform various operations to provide guidance and to capture data during an inspection of a site. For example, processing component 210 may be configured to retrieve, via network interface 280, data related to an inspection routing workflow of a site, provide guidance to an operator during an inspection according to the inspection workflow route, capture data (e.g., image data, sensor data, etc.) using the imaging sensors 230 and sensing component 260 during the inspection, analyze the captured data, perform actions based on the analysis of the captured data and according to the inspection workflow route, and transmit the captured data to an inspection server via network interface 280.

It should be appreciated that inspection guidance module 212 may, in some embodiments, be integrated in software and/or hardware as part of processing component 210, with code (e.g., software instructions and/or configuration data) that is stored, for example, in memory component 220. In some embodiments, a separate machine-readable medium 221 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations disclosed herein. In one aspect, machine-readable medium 221 may be portable and/or located separate from system 200, with the stored software instructions and/or data provided to system 200 by coupling the computer-readable medium to system 200 and/or by system 200 downloading (e.g., via a wired link and/or a wireless link) from computer-readable medium 221. For example, depending on specific embodiments, some or all of the IR camera operations disclosed herein may be performed by processing component 210 and inspection guidance module 212.

Memory component 220 comprises, in one embodiment, one or more memory devices configured to store data and information, including video image data and information. Memory component 220 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory. As discussed above, processing component 210 may be configured to execute software instructions stored in memory component 220 so as to perform method and process steps and/or operations described herein. Processing component 210 and/or image interface 234 may be configured to store in memory component 220 video image frames or digital image data captured by the imaging sensor 230 and/or other sensor data captured by sensing component 260.

Image interface 234 may include, in some embodiments, appropriate input ports, connectors, switches, and/or circuitry configured to interface with imaging sensors 230 to receive image signals (e.g., digital image data). The received videos or image data may be provided to processing component 210. In this regard, the received videos or image data may be converted into signals or data suitable for processing by processing component 210. For example, in one embodiment, video interface 234 may be configured to receive analog video/image data and convert it into suitable digital data to be provided to processing component 210.

Control component 240 comprises, in one embodiment, a user input and/or interface device, such as a rotatable knob (e.g., potentiometer), push buttons, slide bar, keyboard, touch sensitive display devices, and/or other devices, that is adapted to generate a user input control signal. Processing component 210 may be configured to sense control input signals from a user via control component 240 and respond to any sensed control input signals received therefrom. Processing component 210 may be configured to interpret such a control input signal as a value, as generally understood by one skilled in the art. In one embodiment, control component 240 may comprise a control unit (e.g., a wired or wireless handheld control unit) having push buttons adapted to interface with a user and receive user input control values. In one implementation, the push buttons of the control unit may be used to control various functions of system 200, such as initiating an inspection workflow route, capturing images, autofocus, menu enable and selection, field of view, brightness, contrast, noise filtering, image enhancement, and/or various other features of an imaging system or camera.

Display component 250 comprises, in one embodiment, an image display device (e.g., a liquid crystal display (LCD)) or various other types of generally known video displays or monitors. Processing component 210 may be configured to display image data and information (e.g., image analytics information, sensor data, etc.) on display component 250. Processing component 210 may be configured to retrieve image data and information from memory component 220 and display any retrieved image data and information on display component 250. Display component 250 may comprise display circuitry, which may be utilized by the processing component 210 to display image data and information. Display component 250 may be adapted to receive image data and information directly from the imaging sensor 230, processing component 210, and/or video interface component 234, or the image data and information may be transferred from memory component 220 via processing component 210.

Sensing component 260 comprises, in one embodiment, one or more sensors of various types, including a location module that is communicatively coupled with a positioning system (e.g., a global positioning system (GPS), etc.), a thermometer, a barometer, orientation sensor, implemented with a gyroscope, accelerometer, or other appropriate sensor that is disposed within IR camera 104 and configured to detect a current location, and environmental information such as ambient temperature, ambient air pressure, etc. of the environment in which IR camera 104 operates.

Communication interface device 280 may include a network interface component (NIC) or a hardware module adapted for wired and/or wireless communication with a network and with other devices connected to the network. Through communication interface device 280, processing component 210 may retrieve data related to a defined inspection routing workflow, transmit image/video data and other additional analytical data generated by IR camera 104 to external devices (e.g., remote device 282, inspection server 102, etc.), for example for viewing at a remote monitoring or surveillance station, and may receive commands, configurations, or other user input from external devices at a remote station. In various embodiments, communication interface device 280 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components, such as wireless transceivers, adapted for communication with a wired and/or wireless network (e.g., the Internet, a cellular network, etc.). As such, communication interface device 280 may include an antenna coupled thereto for wireless communication purposes. In other embodiments, communication interface device 280 may be adapted to interface with a wired network via a wired communication component, such as a DSL (e.g., Digital Subscriber Line) modem, a PSTN (Public Switched Telephone Network) modem, an Ethernet device, a cable modem, a power-line modem, etc. for interfacing with DSL, Ethernet, cable, optical-fiber, power-line and/or various other types wired networks and for communication with other devices on the wired network.

In various embodiments, various components of system 200 may be combined and/or implemented, as desired or depending on the application or requirements. In one example, processing component 210 may be combined with memory component 220, the imaging sensor 230, video interface component 234, display component 250, communication interface device 280, and/or sensing component 260 and implemented within the enclosure of surveillance camera 102. In another example, processing component 210 may be combined with the imaging sensor 230, such that certain functions of processing component 210 are performed by circuitry (e.g., a processor, a microprocessor, a logic device, a microcontroller, etc.) within the imaging sensor 230.

Figure 3:
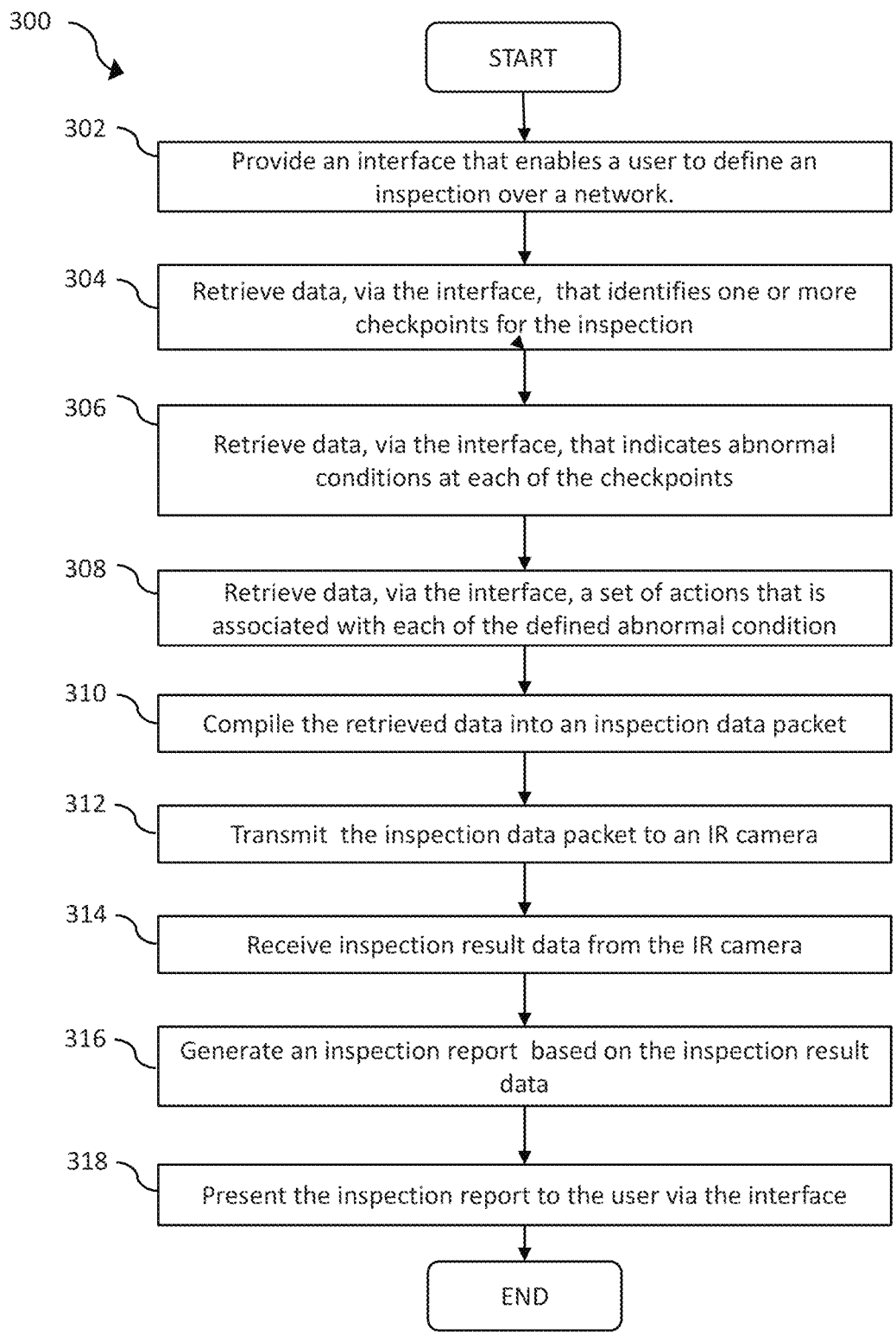
FIG. 3 illustrates a process for defining an infrared inspection routing workflow in accordance with an embodiment of the disclosure.

As discussed above, IR inspection routing system 100 configured as such may provide a user interface that enables a user to remotely define an inspection routing workflow and generate inspection reports based on a completed inspection. Details of such operations are discussed in more details below by reference to FIG. 3, which illustrates a process 300 for enabling a user to define an inspection routing workflow in accordance with an embodiment of the disclosure. In some embodiments, process 300 is performed by inspection server 102.

Process 300 begins by providing (at step 302) a user interface that enables a user (e.g., user 110) to define an inspection routing workflow. In some embodiments, the user interface is implemented as an interactive website that enables the user to interact with inspection server 102 to define one or more inspection workflow routes. In such embodiments, the user interface is provided by inspection server 102 over a network, such as network 108, to a remote device, such as personal computing device 106.

To define an inspection routing workflow, the user may provide data related to a site for which inspection will be performed. The data may include a name and an address. In this regard, inspection server 102 may include a map on the user interface to allow the user to identify an area within the map to be included as part of the site property. In some embodiments, inspection server 102 is configured to prompt the user to identify one or more checkpoints (or assets) and a path that traverses those one or more checkpoints in the site. As such, at step 304, process 300 retrieves data that identifies one or more checkpoints for an inspection routing workflow via the user interface. For example, the user may identify locations of the checkpoints by selecting one or more points or areas on the map presented on the user interface. In another example, a list of checkpoints (assets) may be provided to the user via the user interface (e.g., presented in graphical and/or textual forms), and the user may select one or more checkpoints (assets) from the list.

Figure 4:
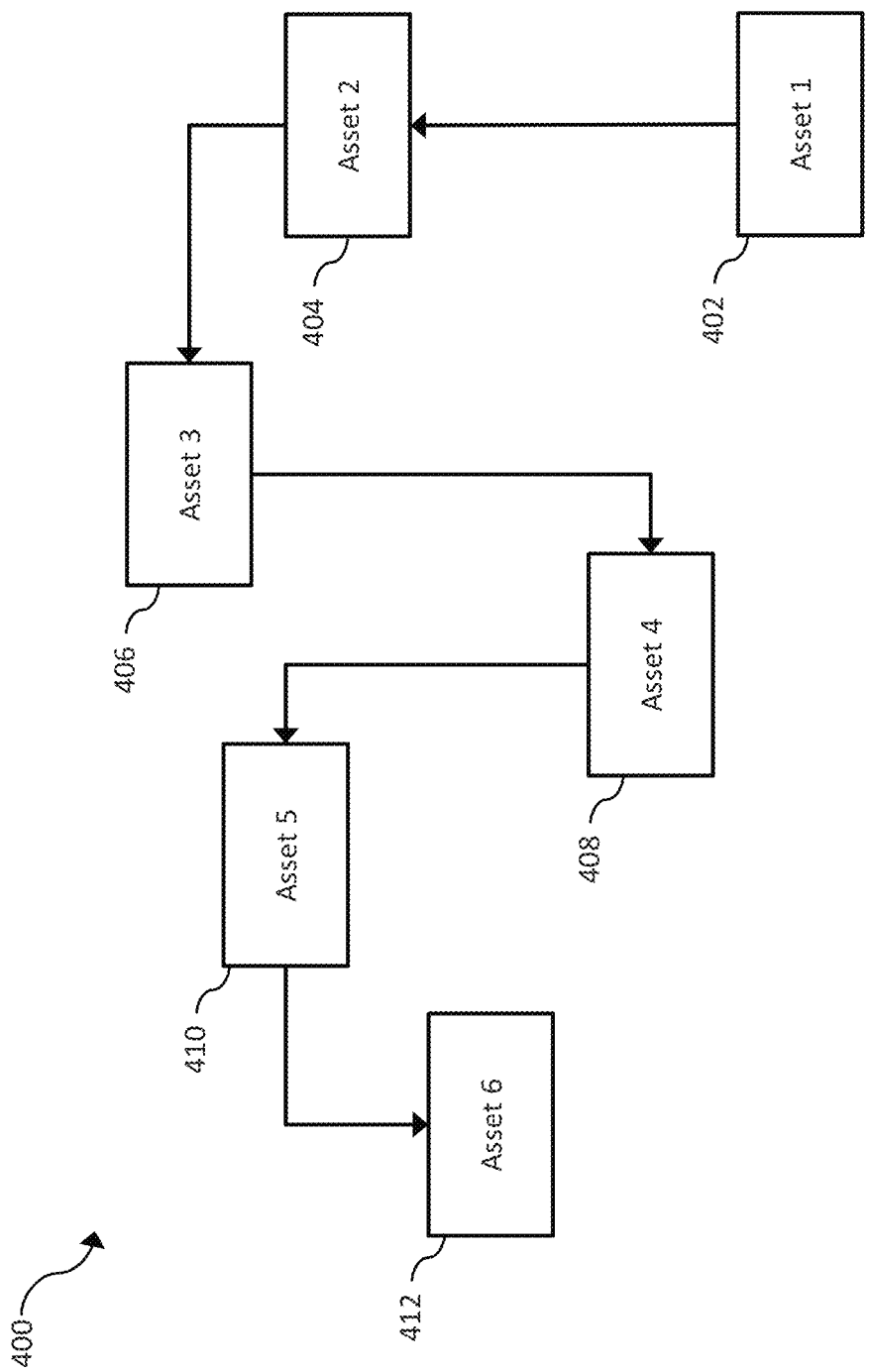
FIG. 4 illustrates an example inspection route in accordance with an embodiment of the disclosure.

In addition to the identification of the checkpoints, the user may also define a route on the site that the inspector has to traverse during an inspection. Preferably, the route also traverses all of the identified checkpoints. FIG. 4 illustrates an example inspection route 400 that could be defined by the user as part of an inspection routing workflow via inspection server 102. In this example, inspection route 400 includes locations of six checkpoints (assets)—checkpoints 402-412, and a route that traverses from checkpoint 402 through checkpoint 412.

Once the checkpoints (assets) and the route are defined, inspection server 102 in accordance with some embodiments of the disclosure may also provide a user interface that enables the user to provide additional information for each checkpoint. For example, the user interface may allow the user to provide a set of required tasks that need to be performed at each checkpoint. The tasks for each checkpoint may include capturing one or more IR images of one or more objects at the checkpoint, capturing one or more images in the visible wavelengths of one or more objects at the checkpoint, performing a visual and/or audio inspection of one or more objects at the checkpoint, taking environmental data (e.g., ambient temperature, ambient air pressure, etc.) at the checkpoint, etc. using one or more sensors (e.g., sensing component 260) on inspection device 104.

Figure 5:
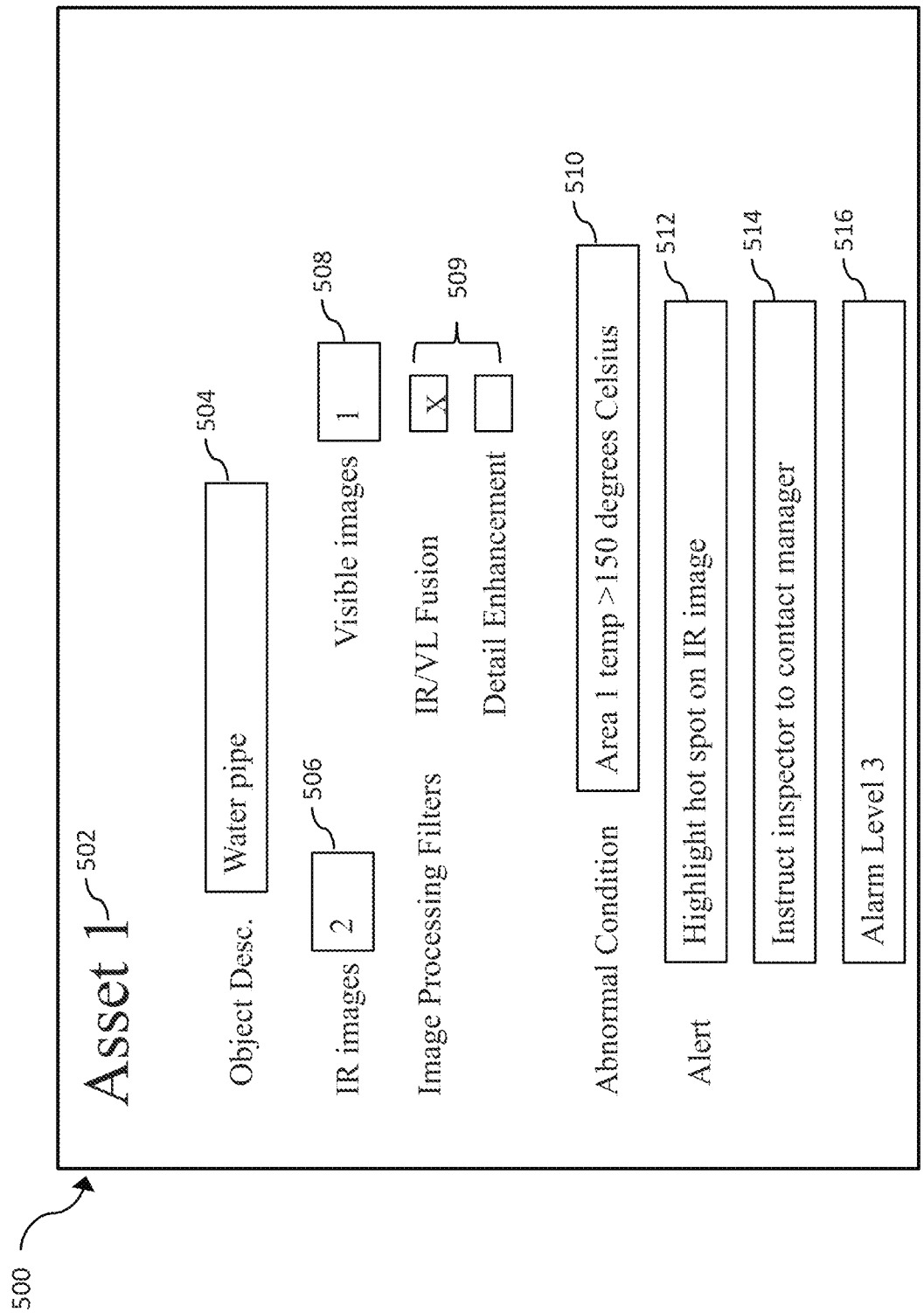
FIG. 5 illustrates an example user interface that enables a user to provide various definitions for a checkpoint in an inspection route in accordance with an embodiment of the disclosure.

FIG. 5 illustrates an example user interface 500 generated by inspection server 102 that enables the user to provide such additional information for each checkpoint. User interface 500 includes a name 502 of the checkpoint (e.g., "Asset 1"). Below the name 502, user interface 500 also includes a set of required tasks that the user has defined for this checkpoint ("Asset 1"). In this example, the user has defined that one of the objects of interest at this checkpoint is the water pipe, as indicated by text box or input field 504. In some embodiments, user interface 500 may be configured to receive (e.g., by allowing the user to upload) one or more reference images (e.g., digital photographs) to aid operator 112 working at site 114 in visually identifying the objects of interest. Further in this example, the user has also requested two IR images and one image in visible wavelengths to be captured of the water pipe at this checkpoint, as indicated by text boxes (or input fields) 506 and 508.

However, other types of instructions may be added instead of or in addition to the ones given in the example discussed above. For example, user interface 500 may also enable the user to indicate what the IR camera needs to perform automatically when it is detected that it has arrived at the checkpoint. In another example, user interface 500 may also enable the user to define annotations (e.g., text notes, comments, geo-positional information, or other information) related to the checkpoint that can be embedded, overlaid, or otherwise associated with the captured images. In another example, user interface 500 may also enable the user to indicate a set of tools (or configurations) to be used by the IR camera automatically for performing the inspection at the checkpoint. Examples of the tools that may be indicated in the instructions may include a measurement tool, such as a spot temperature meter, area temperature meter, and circle temperature meter. Examples of the tools may also include various image processing or filtering tools, such as for image profiling, image enhancement (e.g., enhancing IR image details), and IR and VL image fusion/combination. In the example of FIG. 5, input fields 509 (e.g., check boxes 509) are provided that enable the user to indicate various image processing operations to be performed.

For embodiments in which one or more reference images can be uploaded, user interface 500 may be further configured to enable the user to place one or more measurement tools (e.g., a spot, area, or circle temperature meter) on the reference image, so that more specific measurements (e.g., temperature measurements) of one or more desired areas of the captured IR and/or VL images can be taken. For example, the reference image with a spot, area, and/or circle temperature meter placed at a specific location can be shown to operator 112, who can then interact with IR camera 104 (e.g., using control component 204) to place a corresponding meter on the IR and/or VL images being captured. In another example, IR camera 104 may be configured to automatically place a corresponding meter at the indicated location by performing image matching operations between the reference image and the captured image to find a matching location/part of the images.

In accordance with some embodiments of the disclosure, IR inspection routing system 100 is configured to enable the user to define triggers for performing additional tasks at each check point, via the user interface. The triggers may be defined as conditions detected at the checkpoints. For example, a trigger may be defined as a condition (e.g., an abnormal condition) when the temperature of a water pipe at the checkpoint reaches or exceeds a predetermined threshold. As such, process 300 at step 306 retrieves data, via the user interface, related to triggers (or abnormal conditions) for each checkpoint. Referring to FIG. 5, the user has defined an abnormal condition for checkpoint "Asset 1" to be "water pipe temperature exceeds 150 degrees Celsius, as indicated by text box or input fields 510.

In addition to triggers, IR inspection routing system 100 may also be configured to enable the user, via the user interface, to define a set of actions to be performed when the abnormal condition is detected. As such, process 300 at step 308 retrieves data, via the user interface, a set of actions that is associated with each of the defined abnormal condition. Referring to FIG. 5, the user in this example defines three actions for the abnormal condition of the temperature of the water pipe in checkpoint "Asset 1" exceeding 150 degrees Celsius. As shown, the set of actions include "highlighting the hot spot on the IR image of the water pipe," "instructing the inspector to contact the manager," and "raising the alert level to Level 3 for the site," as indicated by text boxes (input fields) 512, 514, and 516. It is noted that instead of text boxes, the user interface may be configured to provide drop down menu, selection boxes, or other methods that enables the user to define the abnormal conditions and the associated actions. It is also noted that the methods used by inspection server 102 to compile the required tasks, the abnormal conditions, and associated actions for each checkpoint enable inspection server 102 to understand and interpret the tasks, abnormal conditions, and associated actions, such that inspection server 102 may be configured to translate these items into machine readable instructions or software codes that could be interpreted by IR camera 104. IR camera 104 may automatically perform operations based on the machine readable instructions or software codes. For example, based on the software instructions, IR camera 104, when detected that it has arrived at a checkpoint, may be configured to automatically provide or use at least one or more tools (e.g., a spot meter, an area meter, a circle meter, a particular imaging profile, a flexible scene enhancement tool, a thermal image enhancement tool, etc.) for inspecting the facility at the checkpoint.

In the non-limiting examples of FIGS. 4 and 5, a user interface that enables the user to define inspection route 400 (e.g., a plurality of checkpoints) and a user interface (e.g., user interface 500) that enables the user to define a set of instructions for actions to be performed (e.g., by input fields 506-509), criteria for an abnormal condition (e.g., by input fields 510), and a set of action to be performed when an abnormal condition is present are illustrated as being provided as separate user interfaces. However, it is contemplated that user interfaces for defining different aspects of an inspection routing workflow may be provided in combination or separately as desired for particular implementations.

In some embodiments, predefined templates may be provided that are configured to enable the user to enter all or some of the different aspects of an inspection routing workflow automatically using pre-set or pre-filled information. In some embodiments, a user interface that enables the user to modify the predefined templates or define additional templates may be provided.

Process 300 then compiles (at step 310) all of the retrieved data into an inspection routing work flow data packet for the site (e.g., site 114). As mentioned above, inspection server 102 may be configured to compile the retrieved data by generating machine readable instructions or software codes based on all of the retrieved data, and encapsulate the instructions or codes into the inspection routing workflow data packet. Inspection server 102 may be configured to implement the checkpoints in any one of a variety of manners. In one embodiment, inspection server 102 is configured to generate a tag for each checkpoint, and associate data (e.g., data related to the required tasks, abnormal conditions, and associated actions, etc.) related to the checkpoint with the corresponding tag. This way, data that is captured at the different checkpoints during an inspection by IR camera 104 (e.g., IR image data, sensor data, analytical data generated by IR camera 104, etc.) may be associated with their corresponding tags for further analysis and reporting in the future.

At step 312, the inspection routing workflow data packet is transmitted to an IR camera (e.g., IR camera 104). In some embodiments, inspection server 102 is configured to transmit the inspection routing workflow data packet to IR camera 104 in response to a request sent by IR camera 104. For example, the user who defined the inspection routing workflow may assign a unique identifier (e.g., a unique ID code) to the workflow. An operator of IR camera 104 may then be able to request the inspection routing workflow data packet associated with the inspection routing workflow defined by the user by supplying the unique identifier to inspection server 102. One or more inspection routing workflow packets may be transmitted to a single IR camera (e.g., by supplying more than one unique ID codes), and an inspection routing workflow packet may be transmitted to one or more IR cameras within system 100 (e.g., when more than one IR cameras request for the same inspection routing workflow packet). In some embodiments, the user may also assign one or more IR cameras to a particular inspection routing workflow via the user interface, by providing unique identifiers (e.g., MAC addresses, static IP addresses, cellular phone numbers, etc.) to inspection server 102. In these embodiments, inspection server 102 may be configured to automatically transmit the inspection routing workflow data packet to the assigned cameras based on their unique identifiers when the inspection routing workflow data packet is generated and/or when the inspection routing workflow data packet is modified.

In some embodiments, each inspection routing workflow data packet is associated with a geographical location that is based on the geographical location of the inspection site. In these embodiments, IR camera 104 that is equipped with a location module (e.g., a GPS module as part of sensing component 260) for determining a current location of IR camera 104 may be configured to automatically request an inspection workflow routing packet from inspection server 102 based on the current location of IR camera 104.

Figure 6:
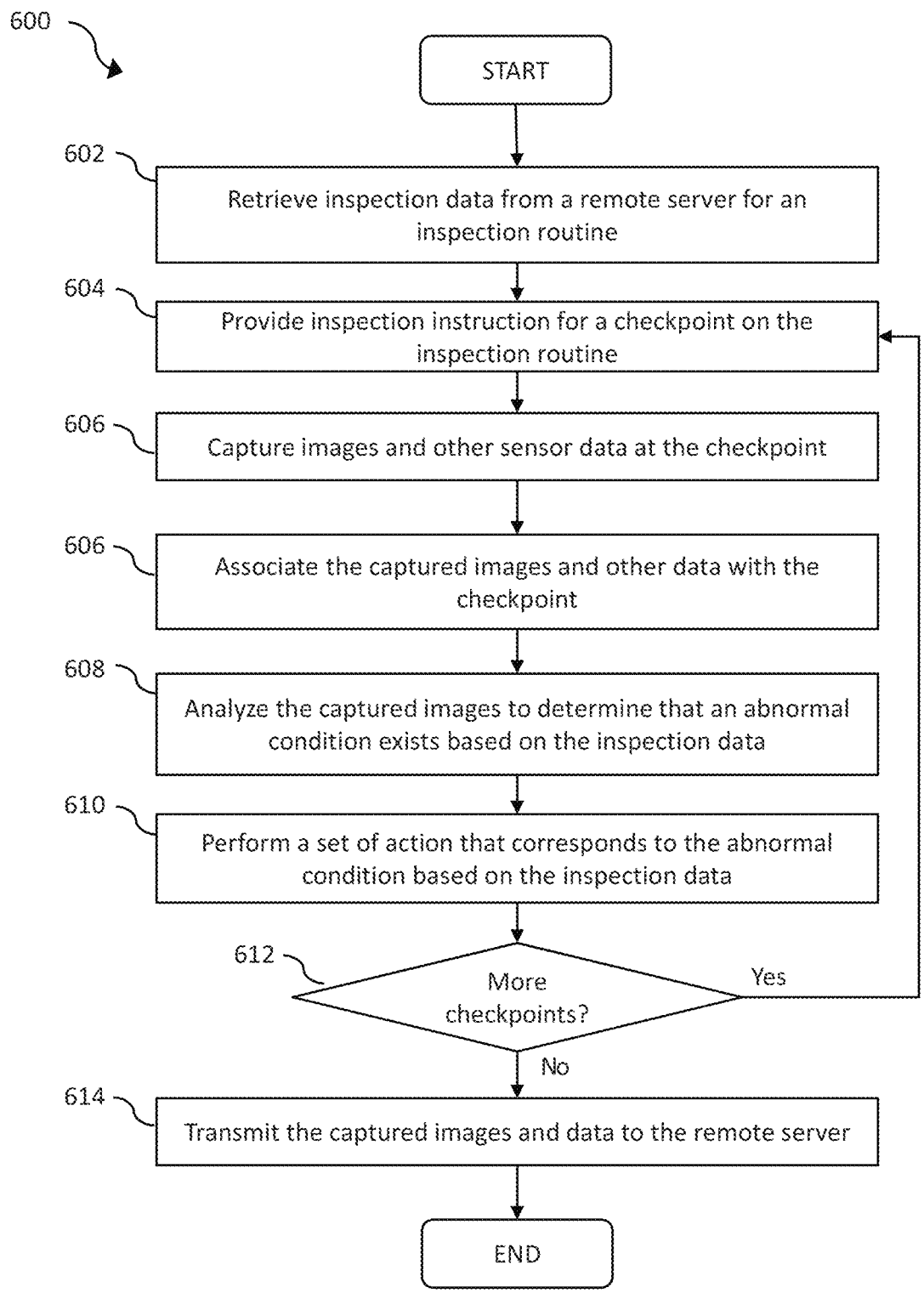
FIG. 6 illustrates a process for performing an inspection in accordance with an embodiment of the disclosure.

Once IR camera 104 has retrieved, from inspection server 102 over network 108, the inspection workflow routing packet for site 114, IR camera 104 is ready to assist operator 112 to perform an inspection for site 114. FIG. 6 illustrates a process 600 performed by a camera (e.g., IR camera 104 of system 100) during an inspection of a site (e.g., site 114), in accordance with an embodiment of the disclosure. Process 600 may be initiated manually by a user providing an input to IR camera 104, for example, via control component 240. Alternatively, process 600 may be initiated automatically by IR camera 104 when IR camera 104 detects that the current location of IR camera 104 matches the geographical area of site 114.

Process 600 begins with retrieving (at step 602) inspection data (e.g., an inspection routing workflow packet) for an inspection routine work flow from a remote server. As discussed above, different embodiments of the disclosure provide different techniques to perform this retrieving step. For example, an operator (e.g., operator 112) of IR camera 104 may initiate retrieving of a particular inspection routing workflow packet by providing a unique identifier associated with the particular inspection routing workflow packet. In another example, IR camera 104 may be configured to automatically initiate a retrieval of a particular inspection routing workflow packet by detecting (e.g., using the location module of camera 104) the current location of IR camera 104 and requesting the remote server for an inspection routing workflow packet that is associated with its current location. In yet another example, IR inspection routing workflow system 100 may implement a push model where inspection server 102 is configured to automatically transmit (push) the inspection routing workflow packet (that has just been defined or modified) to the corresponding camera or devices based on an assignment provided by the user who defined the inspection routing workflow packet.

Figure 7:
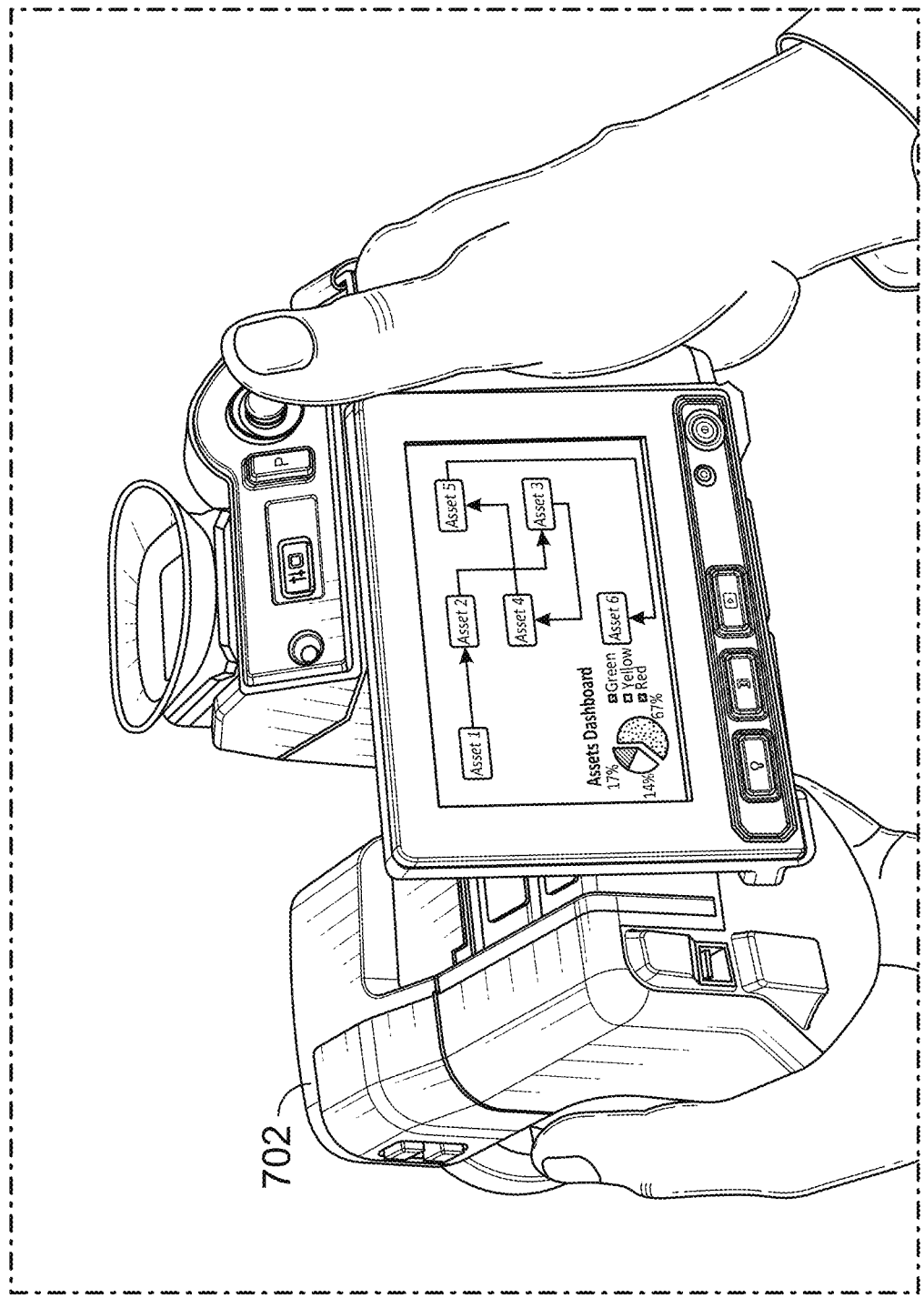
FIG. 7 illustrates an example presentation of an inspection instruction provided by an IR camera in an inspection route in accordance with an embodiment of the disclosure.

Once the inspection workflow routing packet is retrieved, IR camera 104 may use data and information from the inspection routing workflow packet to guide operator 112 to perform the inspection on site 114 and perform analysis on the gathered data during the inspection. As discussed above, an inspection routing workflow may include (or defined with) multiple checkpoints along the route. Thus, at step 604, inspection instruction is provided to guide the operator along the route to the next checkpoint in the inspection routing workflow and inform the operator specific task or tasks to be performed at the checkpoint. For example, the inspection routing workflow packet may include information about the route and the checkpoints on a map of site 114. IR camera 104 may be configured to present the map of site 114, along with the route and checkpoints information on display component 250 to guide operator 112 to the next checkpoint. For example, IR camera 104 may be configured to present the route map created by user 110 as shown in FIG. 4. IR camera 104 may be configured to also use the location module to determine a current location of IR camera 104, and use that information to assist in guiding operator 112 to the next checkpoint. FIG. 7 illustrates an example IR camera 702 presenting such a map and routing information on a display 704 during step 604.

In addition to instructions to guide operator 112 to the next checkpoint, IR camera 104 may also be configured to present instructions to operator 112 to perform a set of tasks at the checkpoint according to information from the inspection routing workflow data packet. For example, IR camera 104 may be configured to present the instructions on display component 250. The instructions may include description and/or reference images of objects that need to be inspected at the checkpoint (e.g., water pipe), data that needs to be collected at the checkpoint (e.g., two IR images and one image in visible wavelengths, etc.). In some embodiments, IR camera 104 is configured to automatically present the instructions as described above when it is detected (e.g., using the location module) that IR camera 104 has arrived at the checkpoint.

If the inspection routing workflow data packet includes tasks for the checkpoint that could be performed by IR camera 104 without instructions from an operator (such as obtaining ambient temperature, ambient air pressure, etc.), IR camera 104 in accordance with some embodiments of the disclosure is configured to automatically obtain the requested data (e.g., by using sensing component 260) when it is detected that IR camera 104 is located at the checkpoint.

While at the checkpoint, operator 112 may use IR camera 104 to perform the tasks according to the instructions provided by IR camera 104. For example, operator 112 may use IR camera 104 to capture IR images and images in visible wavelengths at the checkpoint. It is noted that after it is detected that IR camera has arrived at the checkpoint, IR camera 104 may be configured to automatically use a specific set of tools for performing the inspection, according to the instructions received from serve 102.

For example, according to the received instructions, IR camera 104 may be configured to use one of a spot meter, an area meter, a circle meter, a particular imaging profile, a flexible scene enhancement tool, a thermal image enhancement tool, etc. during the inspection to obtain data at this checkpoint. At step 606, the data obtained at the checkpoint (including sensor data obtained from sensing component 260 and image data captured by imaging sensor 230) is associated with the checkpoint. For example, IR camera 104 may be configured to tag the data obtained at the checkpoint with a tag that is associated with the checkpoint, such that data obtained from various checkpoints can be divided or grouped in different manners in the future.

In accordance with some embodiments of the disclosure, after obtaining data at the checkpoint, IR camera 104 is configured to also analyze the data to determine whether one or more abnormal conditions is present at the checkpoint according to the inspection routing workflow data packet (step 608). In the example given above, one of the abnormal conditions defined by user 110 includes the temperature of the water pipe at the checkpoint to be greater than 150 degrees Celsius. In this example, IR camera 104 may be configured to analyze IR images and/or images in visible wavelengths to determine the temperature of the water pipe at this checkpoint.

In this regard, IR camera 104 of some embodiments may use object recognition techniques such as feature-based methods (e.g., scale-invariant feature transform, etc.) to determine an area within the captured IR images that represent the object of interest (e.g., the water pipe), and retrieve temperature data from that area of the IR images. The IR images and images of visible wavelengths may capture overlapped regions of a scene, IR camera may be configured to use different techniques to map areas (or pixels) of the image in visible wavelengths to corresponding areas (or pixels) in the IR images. The object recognition algorithm may then be performed on the images in visible wavelengths, as they have better clarity and edges than IR images. Once an area within the image in visible wavelengths is determined to represent the object of interest, IR camera 104 can then determine the corresponding area in the IR images that represent the object of interest, and retrieve IR data from that area of the IR images to determine a temperature of the object of interest.

Although in this example, only IR images and images of visible wavelengths are used to determine whether an abnormal condition exists at the checkpoint, other data (e.g., sensor data) may also be used to make such a determination in other examples.

At step 610, if it is detected that an abnormal condition exists at the checkpoint, a set of actions corresponding to the abnormal condition according to the inspection routing workflow data packet will be performed. In the example given above, user 110 has provided in the inspection routing workflow that a set of actions to be associated with the abnormal condition of water pipe temperature being detected to be above 150 degrees Celsius. As indicated in FIG. 5, the set of actions include highlighting the hot area of the water pipe in the IR image, instructing the operator to contact the manager, and raising the alarm level of this checkpoint to Alarm Level 3. As such, in this example, IR camera 104 is configured to modify the captured IR images to highlight the hot area(s) of the water pipe. In this regard, IR camera 104 may be configured to add one or more annotation to the IR images. The annotation may be implemented as an indicator (e.g., a line in different colors than the rest of the IR image) to outline the hot area(s). The annotation may be implemented by modifying the colors of the hot area(s) to a color tone (e.g., yellow, red) that is different than the color tone (e.g., grey) of the rest of the IR images. Furthermore, the annotation may be implemented in the form of a text to be added to the IR images.

IR camera 104 may also be configured to present an instruction to contact the manager of site 114 on display component 250. Furthermore, IR camera 104 may also be configured to transmit a signal to an external device (e.g., a server associated with site 114), for example, via network interface 280, to indicate that the alarm level of the checkpoint is being raised to Alarm Level 3.

After performing all of the actions that correspond to the detected abnormal condition at the checkpoint, at step 610, process 600 determines whether there are more checkpoints to traverse for this inspection, based on the inspection routing workflow data packet. If it is determined that there are more checkpoints in the route, process 600 goes back to step 604 and reiterates through steps 612, performing the operations for the next checkpoint.

On the other hand, if it is determined that there is no more checkpoint in the route (e.g., operator 112 has traversed all of the checkpoints defined in the inspection routing workflow data packet), the data obtained during the inspection, including the captured images and sensor data, is transmitted (at step 614) to inspection server 102. For example, IR camera 104 may encapsulate the data collected during the inspection in a data packet and transmit the data packet to inspection server 102 via network interface 280. In addition to sending the data packet back to inspection server 102, IR camera 104 may also sends the data packet to any other external devices that is defined within the inspection routing workflow data packet. For example, user 110 may also desire to have the inspection results sent to the server associated with site 114.

Referring back to FIG. 3, at step 315, inspection result data is received. For example, inspection server 102 may receive the data packet that is prepared by IR camera 104 after the completion of an inspection on site 114. The data packet includes all data obtained during the inspection. It is noted that each piece of data was also associated with a corresponding checkpoint. Based on the received data packet, an inspection report may be generated at step 316, and then subsequently presented (at step 318) to user 110 via the user interface.

Figure 8:
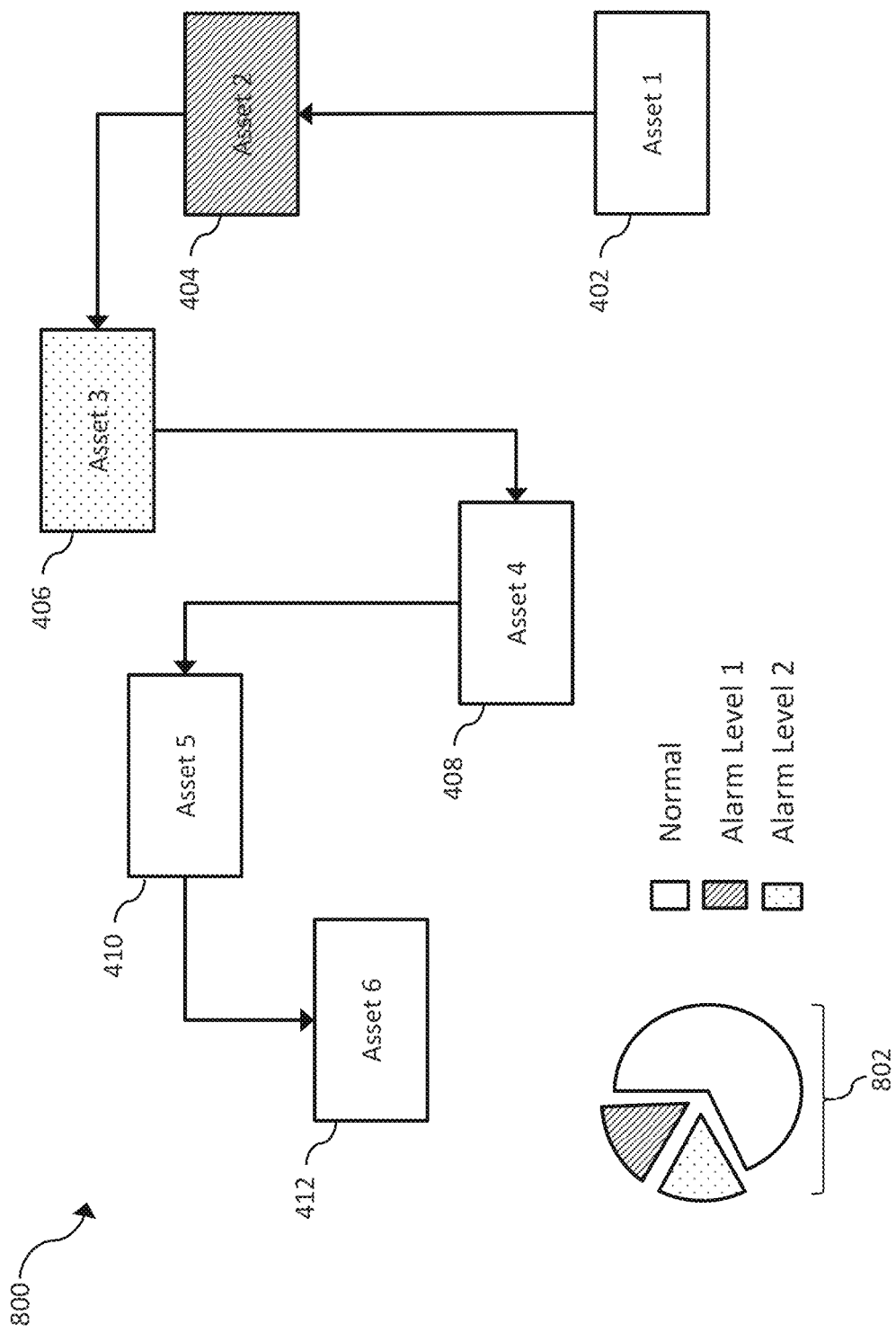
FIG. 8 illustrates an example inspection report provided by an inspection server in accordance with an embodiment of the disclosure.

FIG. 8 illustrates an example inspection report 800 generated by inspection routing system 100 in accordance with some embodiments of the disclosure. In some embodiments, inspection report 800 is an overview report that provides a glimpse of statuses of various checkpoints in the inspection route without providing details in each checkpoint. In this example, inspection report 800 includes a routing map along with the various checkpoints 402-412 of the inspection route that correspond to the map and checkpoints shown in FIG. 4. Unlike routing map 400 of FIG. 4, each checkpoint shown on inspection report 800 is labeled with a status based on the data packet received from IR camera 104. In this example, the checkpoints 402-412 may be labeled with one of three different statuses—"Normal," "Alarm Level 1," or "Alarm Level 2." For example, based on the data packet received from IR camera 104, checkpoints 402, 408, 410, and 412 are labeled with a "Normal" status, checkpoint 404 is labeled with an "Alarm Level 1" status, and checkpoint 406 is labeled with an "Alarm Level 2" status. In some embodiments, inspection report 800 also includes a summary chart 802 that shows a distribution of checkpoints in different labels, for example, in a pie chart.

Figure 9:
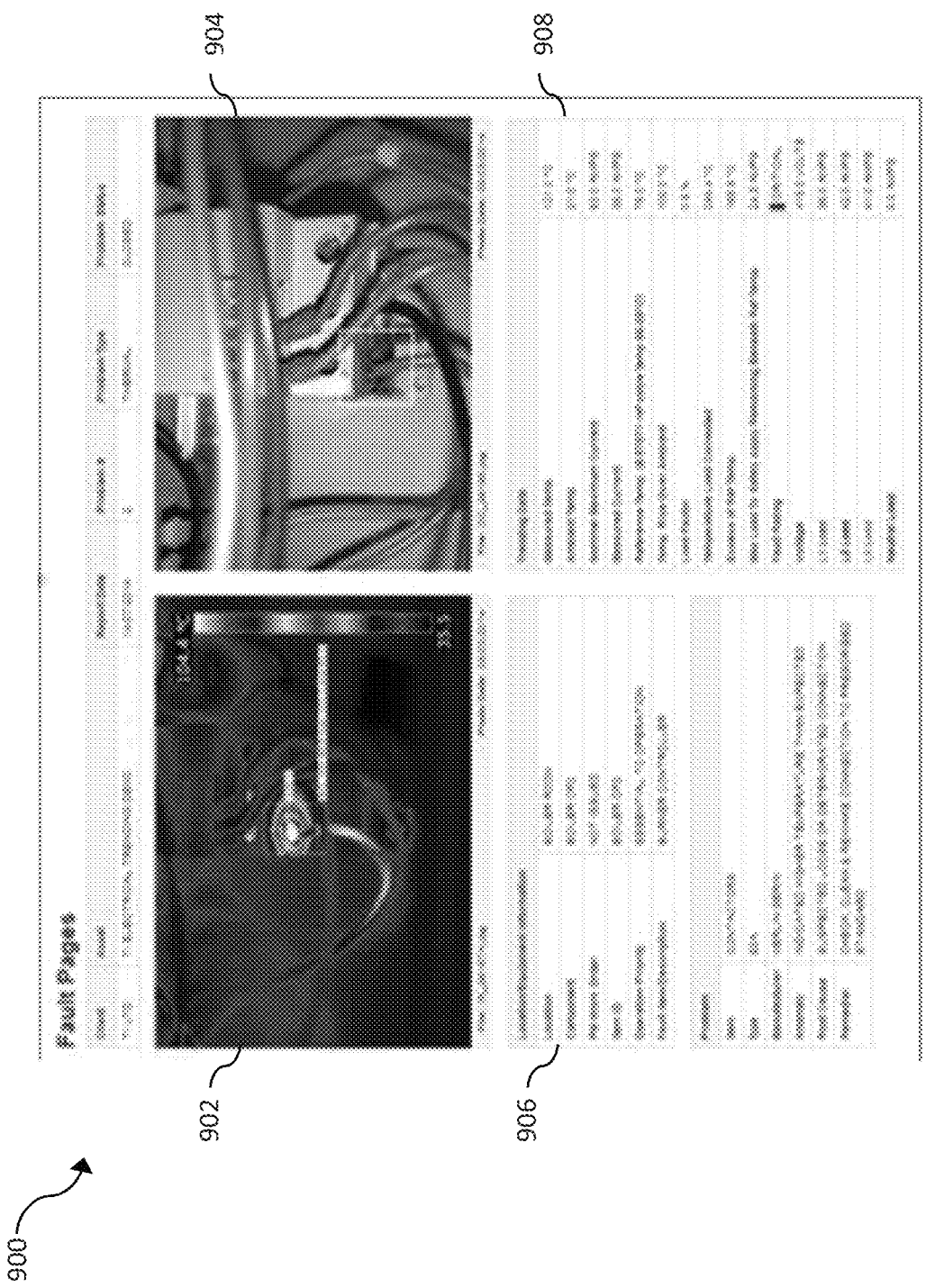
FIG. 9 illustrates another example inspection report provided by an inspection server in accordance with an embodiment of the disclosure.

FIG. 9 illustrates another example inspection report 900 that may be generated by inspection routing system 100 in accordance with some embodiments of the disclosure. Inspection report 900, in some embodiments, is a detailed report that includes detailed findings during the inspection. In one embodiment, inspection report 900 corresponds to a particular checkpoint in the inspection route (e.g., checkpoint 402). Data associated with a checkpoint may be retrieved by inspection server 102 from the data packet transmitted from IR camera 104. As discussed above, each piece of data may be tagged with a corresponding label that indicates a particular checkpoint with which the piece of data is associated. In this example, inspection serve 102 may be configured to retrieved, from the received data packet, all data that is tagged with a "checkpoint 402" label. As shown, inspection report 900 includes images, such as an IR image 902 and an visible wavelengths image 904, captured by IR camera 104 at the checkpoint 402. The images displayed in inspection report 900 may also include the annotations added to the images during the inspection by IR camera 104. Inspection report 900 may also include other data captured at the checkpoint. In this example, this additional data is displayed in display areas 906 and 908, and may include but not limited to, date and time that the inspection was performed, ambient data (e.g., temperature, air pressure) captured at the checkpoint 402, IR data from IR image 902 (e.g., temperature of the object of interest, temperature deviation from normal, etc.), comparison between data captured during this most recent inspection with historic captured data at the checkpoint 402, etc.

It has been contemplated that based on a review of such inspection reports (inspection reports 800, 900, etc.), user 110 may decide to modify the inspection route for site 114. For example, user 110 may desire to add one or more checkpoints to the inspection route, remove one or more checkpoints from the inspection route, modify the required tasks at one or more checkpoints, modify the criteria for an abnormal condition for one or more checkpoints, modify the action in response to the abnormal condition for one or more checkpoints, etc. In accordance with some embodiments of the disclosure, inspection server 102 may enable user 110 to make such changes to the inspection route work flow data via the user interface. Once the inspection route work flow data is modified, inspection server 102 may re-compile the inspection route work flow data into an inspection data packet and transmit the updated inspection data packet to IR camera 104. Transmission of the updated inspection data packet may be performed automatically by inspection server 102 (in a "push" mode) or in response to a request from IR camera 104 (in a "pull" mode), for example, the next time IR camera 104 is turned on and detects that it is currently located in site 114.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the scope and spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Where applicable, the ordering of various steps described herein can be changed, combined into composite steps, and/or separated into sub-steps to provide features described herein.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A cloud-based infrared (IR) inspection routing system comprising:
a server comprising:
a non-transitory memory storing machine-readable instructions for the server;
one or more hardware processors communicatively coupled to the non-transitory memory and configured to execute the machine-readable instructions to cause the server to perform operations comprising:
providing a first user interface that enables a user to define a plurality of checkpoints along an inspection route for an inspection of a location of each checkpoint;
providing a second user interface that enables the user to define, for each checkpoint along the inspection route, a set of instructions for actions to be performed at the checkpoint;
providing a third user interface that enables the user to define, for each checkpoint, criteria for an abnormal condition;
providing a fourth user interface that enables the user to define, for each abnormal condition at the checkpoint, a set of actions to be performed when it is detected that the abnormal condition is present; and
transmitting inspection data to an IR camera, the inspection data defining the inspection route and defining, for each checkpoint:
(a) the set of instructions to be performed at the checkpoint, including one or more instructions to capture one or more images by the IR camera at the checkpoint;
(b) criteria for the abnormal condition; and
(c) the set of actions to be performed when it is detected that the abnormal condition is present based on the criteria defined by the user.

2. The cloud-based IR inspection routing system of claim 1, wherein the user interfaces comprise a web interface provided to the user via a personal computing device remote from the server.

3. The cloud-based IR inspection routing system of claim 1, wherein two or more of the first, the second, the third, and the fourth user interfaces are combined into one user interface.

4. The cloud-based IR inspection routing system of claim 1, wherein the operations performed by the server further comprise:
compiling an inspection data packet comprising the inspection data; and
storing the inspection data packet in the non-transitory memory.

5. The cloud-based IR inspection routing system of claim 4, wherein the operations performed by the server further comprise transmitting the inspection data packet to the IR camera over a network; and wherein the compiling of the inspection data packet comprises generating a set of machine-readable instructions to be executed by the IR camera.

6. The cloud-based IR inspection routing system of claim 5, wherein the set of machine-readable instructions to be executed by the IR camera comprises machine-readable instructions that cause the IR camera to determine whether the abnormal condition is present based on the criteria defined by the user.

7. A cloud-based infrared (IR) inspection routing system comprising:
a server comprising:
a non-transitory memory storing machine-readable instructions for the server;
one or more hardware processors communicatively coupled to the non-transitory memory and configured to execute the machine-readable instructions to cause the server to perform operations comprising:
providing a first user interface that enables a user to define a plurality of checkpoints along an inspection route for an inspection of a location of each checkpoint;
providing a second user interface that enables the user to define, for each checkpoint along the inspection route, a set of instructions for actions to be performed at the checkpoint;
providing a third user interface that enables the user to define, for each checkpoint, criteria for an abnormal condition; and
providing a fourth user interface that enables the user to define, for each abnormal condition at the checkpoint, a set of actions to be performed when it is detected that the abnormal condition is present.
wherein the operations performed by the server further comprises:
compiling an inspection data packet comprising data related to the plurality of checkpoints, the set of instructions to be performed at the checkpoint, criteria for the abnormal condition, and the set of actions to be performed when it is detected that the abnormal condition is present defined by the user; and
storing the inspection data packet in the non-transitory memory;
wherein the IR inspection routing system further comprising comprises an IR camera having:
a display component; and
a logic device configured to:
retrieve, wirelessly from the server over a network, the inspection data packet related to the inspection at the location;
provide an inspection instruction via the display component based on the retrieved inspection data packet;
associate an IR image of a scene captured during the inspection with one checkpoint in the plurality of checkpoints; and
provide an alert via the display component based on an analysis of the captured IR image and the abnormal condition defined by the inspection data packet.

8. The cloud-based IR inspection routing system of claim 7,
wherein the IR camera further comprises a location module configured to determine a current location of the IR camera;
wherein the logic device is further configured to associate the IR image of the scene with the one checkpoint based on the determined current location of the IR camera; and
wherein the abnormal condition defined by the inspection data packet comprises a normal temperature range for an object at the one checkpoint.

9. The cloud-based IR inspection routing system of claim 8, wherein the logic device of the IR camera is further configured to analyze the captured IR image according to the inspection data packet.

10. The cloud-based IR inspection routing system of claim 9, wherein analyzing the captured IR image comprises:
identifying an area within the captured IR image that corresponds to the object; and
determining that the abnormal condition exists when temperature data of the area within the captured IR image deviates from the normal temperature range.

11. The cloud-based IR inspection routing system of claim 10, wherein the logic device of the IR camera is further configured to, in response to deteiiiiining that the abnormal condition exists, perform the set of actions associated with the abnormal condition according to the inspection data packet; and
wherein the set of actions comprises:
modifying the captured IR image by adding an annotation to the captured IR image according to the inspection data; and
displaying the modified IR image on the display component.

12. The cloud-based IR inspection routing system of claim 11, wherein modifying the captured IR image comprises highlighting the area corresponding to the object.

13. The cloud-based IR inspection routing system of claim 7, wherein the IR camera further comprises a wireless communication component that enables the IR camera to retrieve the inspection data from the server over the network and transmit resulting data of the inspection to the server.

14. A method of using the system of claim 13, the method comprising:
viewing the inspection instruction displayed via the display component of the IR camera;
locating each checkpoint based on the inspection instruction;
performing the actions to be performed at checkpoint using the IR camera based on the inspection instruction; and
causing the IR camera to transmit the resulting data of the inspection to the server.

15. A method of using the system of claim 1, the method comprising:
defining the plurality of checkpoints along the inspection route by interacting with the first user interface;
defining the set of instructions for the actions to be performed at the checkpoints by interacting with the second user interface;
defining the criteria for an abnormal condition for the checkpoints by interacting with the third user interface; and
defining the set of action to be performed when it is detected that the abnormal condition is present at each checkpoint by interacting with the fourth user interface.

16. A method of facilitating an infrared (IR) inspection routing, comprising:
providing, by a server, a first user interface that enables a user to define a plurality of checkpoints along an inspection route for an inspection of a location;
providing, by the server, a second user interface that enables the user to define, for each checkpoint along the inspection route, a set of instructions for actions to be performed at the checkpoint;
providing, by the server, a third user interface that enables the user to define, for each checkpoint, criteria for an abnormal condition; and
providing, by the server, a fourth user interface that enables the user to define, for each abnormal condition at the checkpoint, a set of actions to be performed when it is detected that the abnormal condition is present;
compiling, by the server, an inspection data packet comprising data related to the plurality of checkpoints, the set of instructions for the actions to be performed at the checkpoints, criteria for the abnormal condition, and the set of actions to be performed when it is detected that the abnormal condition is present defined by the user;

transmitting the inspection data packet to an inspection device over a network;
retrieving, wirelessly by the inspection device from the server over the network, the inspection data packet related to the inspection at the location;
providing, by the inspection device, an inspection instruction via [[the]] a display component based on the retrieved inspection data packet;
associating, by the inspection device, an IR image of a scene captured during the inspection with one checkpoint in the plurality of checkpoints; and
providing, by the inspection device, an alert via the display component based on an analysis of the captured IR image and the abnormal condition defined by the inspection data packet.

17. The method of claim 16, wherein the user interfaces are provided by the server through a web interface accessible by a personal computing device remote from the server; and
wherein two or more of the first, the second, the third, and the fourth user interfaces are combined into one user interface.

18. The cloud-based IR inspection routing system of claim 1, wherein for at least one checkpoint, the inspection data include information to guide an operator of the inspection device to the next checkpoint in the inspection route, to use the inspection device at the next checkpoint.

19. The method of claim 16, wherein for at least one checkpoint, the inspection data include information to guide an operator of the inspection device to the next checkpoint in the inspection route, to use the inspection device at the next checkpoint.

* * * * *

UNITED STATES PATENT AND TRADEMARK OFFICE
CERTIFICATE OF CORRECTION

PATENT NO. : 10,732,123 B2  
APPLICATION NO. : 15/992762  
DATED : August 4, 2020  
INVENTOR(S) : Mats Ahlstrom, Kent Wickenberg and Tintin Razavian Page 1 of 1

It is certified that error appears in the above-identified patent and that said Letters Patent is hereby corrected as shown below:

In the Specification

In Column 4, Line 60, change "application Ser. No." to --application No.--

In the Claims

In Column 19, Line 29 and 30, change "further com-prising comprises" to --further comprises--

In Column 20, Line 3, change "deteiiiiining" to --determining--

In Column 20, Line 27, change "at checkpoint" to --at each checkpoint--

In Column 21, Line 7, delete "[[the]]"

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*